Patented Mar. 19, 1940

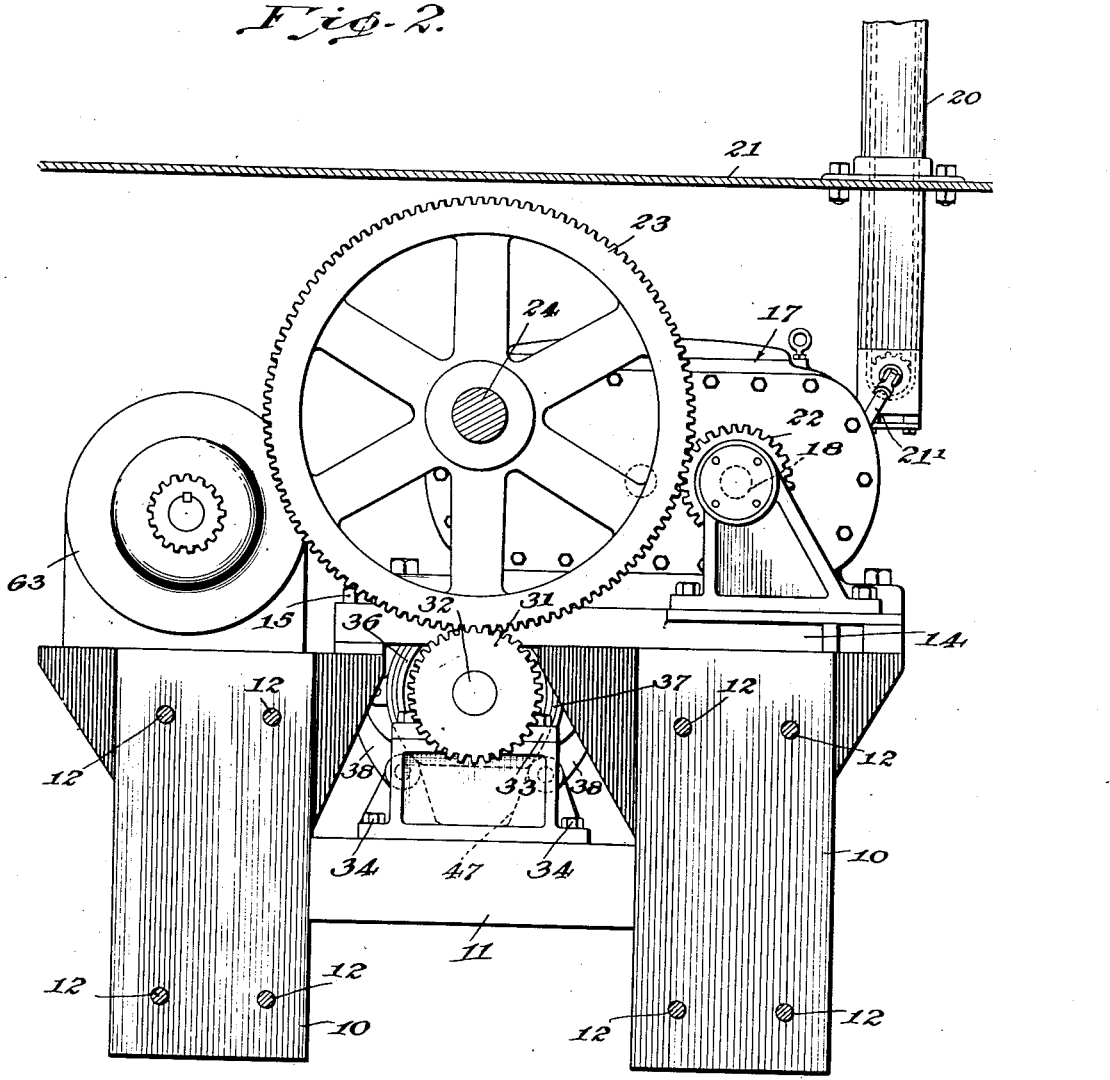

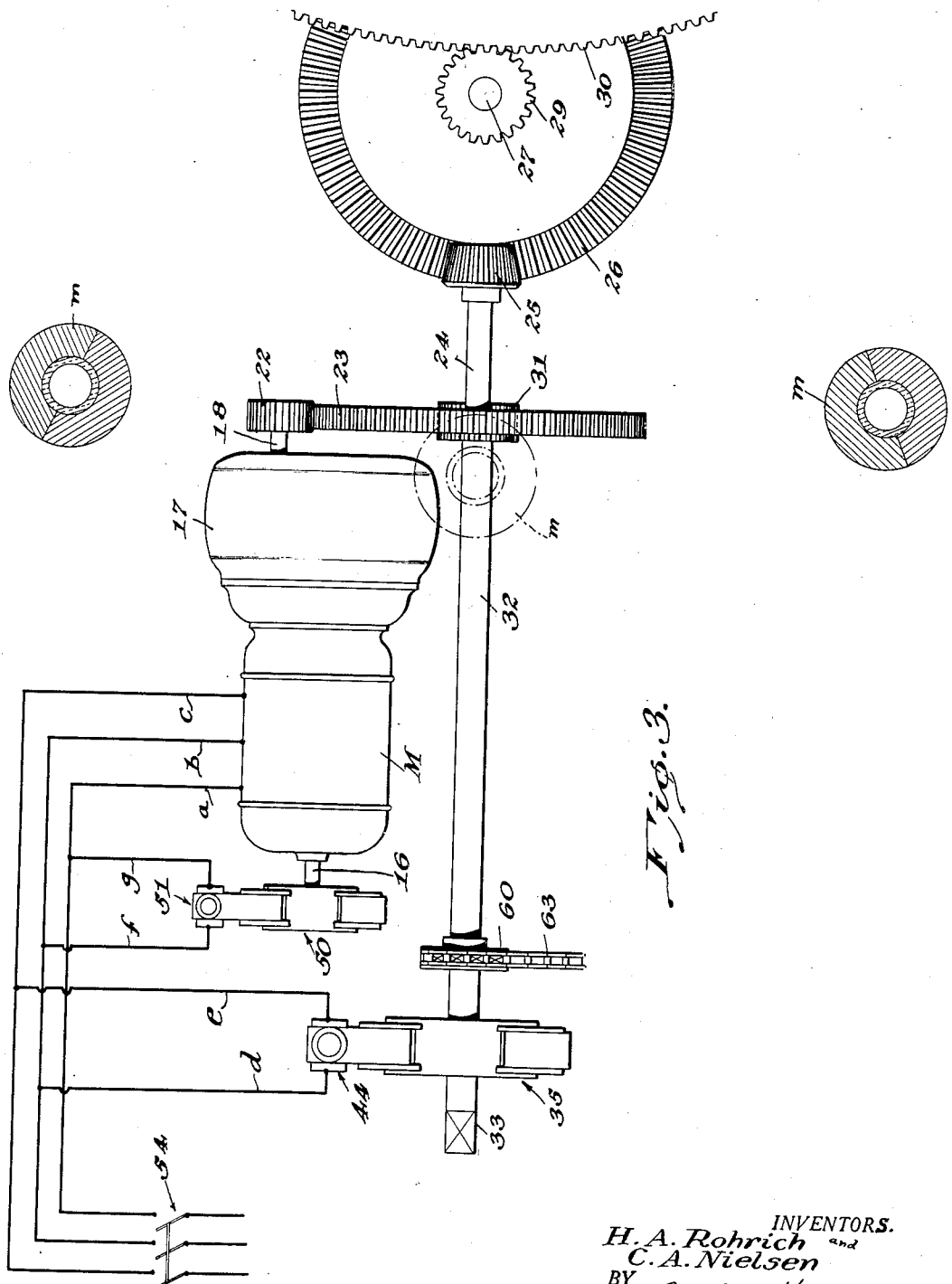

2,194,368

UNITED STATES PATENT OFFICE 2,194,368

POWER TRANSMITTING APPARATUS

Harold A. Rohrich and Carl A. Nielsen, Alton, Ill., assignors to Owens-Illinois Glass Company, a corporation of Ohio Application February 25, 1938, Serial No. 192,492

2 Claims. (Cl. 188—172)

The improved power transmitting apparatus comprising the present invention is primarily adapted for use in transmitting rotary motion to bottle forming machines of the Owens type, although the principles of the invention are applicable to other machines and the apparatus may, if desired, be employed for transmitting motion to other relatively heavy duty machinery.

Heretofore in transmitting rotary motion to such bottle forming machines, the drive has been effected from a variable speed direct current motor through a suitable gear reduction mechanism directly to the driving gear of the machine with the result that when the circuit to the motor was interrupted, either for the purpose of shutting down the machine or for the purpose of stopping the machine temporarily due to an emergency, the angular momentum of the relatively heavy machine has been assimilated by the motor and speed transmission unit. This overrunning of the machine has resulted in placing an undue strain on the motor and on the gearing connected thereto while at the same time cessation of the operation of the machine has not been sufficiently abrupt to satisfy emergency requirements. Furthermore, the use of a direct current motor has resulted in fluctuations in the speed of machine operation, thereby causing variations in the operating characteristics of the machine.

The principal object of the invention is to provide a power transmitting apparatus which will obviate the above mentioned difficulties by providing a more uniform drive for the machine at any selected speed of rotation thereof, while at the same time, provision is made for independently braking both the momentum of the machine itself and of the motor by means of which the machine is driven, the braking mechanisms automatically coming into operation when the supply of current to the driving motor is interrupted.

Another object of the invention is to provide a power transmitting apparatus of the type set forth above which affords a convenient and efficient power take-off or timing gear take-off for independently driving various auxiliary machine equipment such as a bottle take-out device, bottle uprighter, leer loader or other machine adjunct in synchronism with the rotary movement of the forming machine.

Other objects and advantages of the invention not at this time enumerated will become apparent as the description ensues.

In the accompanying drawings in which one embodiment of the invention is shown:

Fig. 2 is a fragmentary end elevational view (partly in section) of the apparatus taken in the opposite direction from the disclosure of Fig. 1, and Fig. 3 is a diagrammatic view of the apparatus showing the electrical connections therefor.

Figure 1:
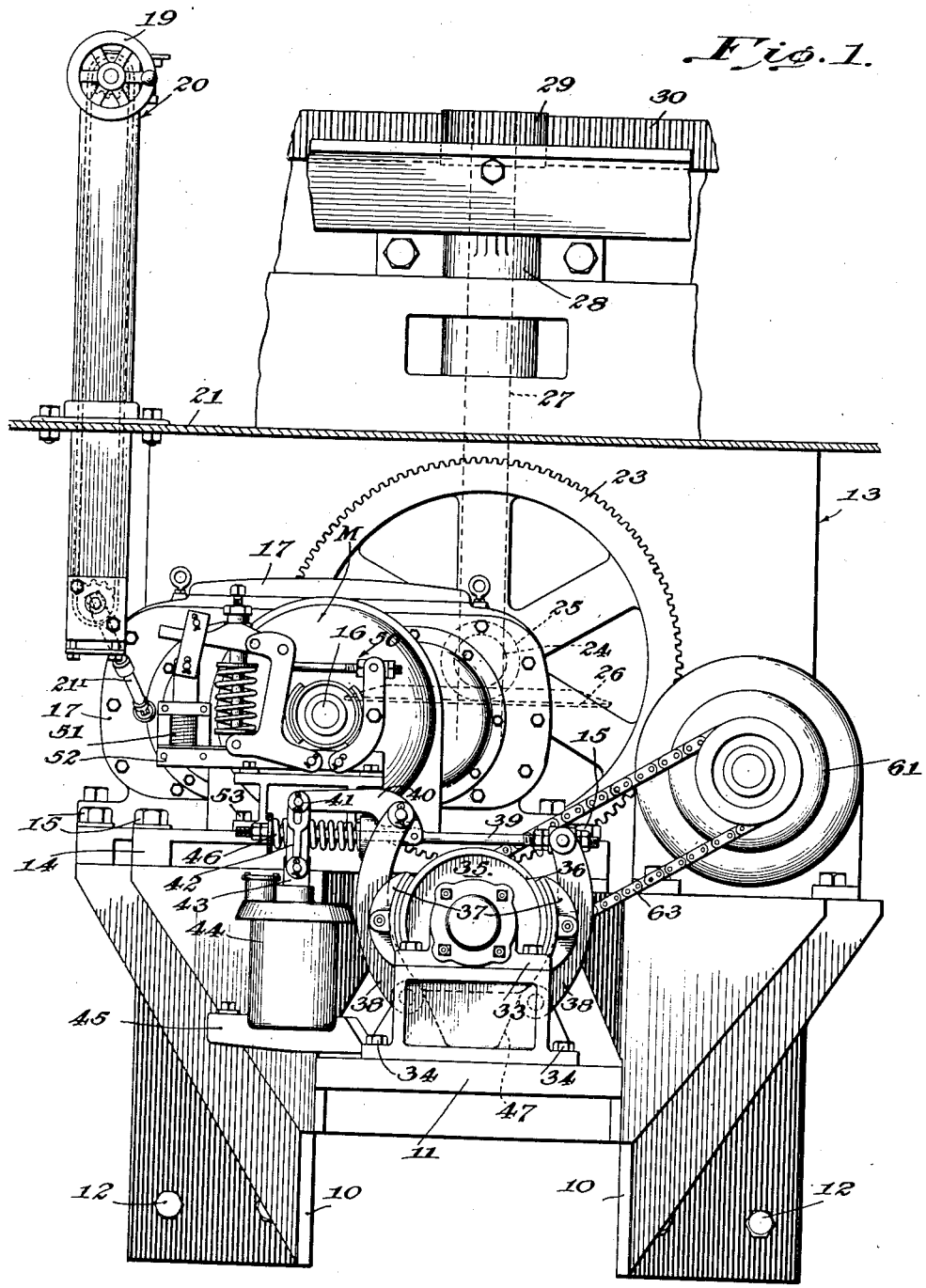
Fig. 1 is an end elevational view of the power transmitting apparatus showing the same operatively connected to a rotary bottle forming machine of the Owens type.

The apparatus is shown connected to a rotary bottle forming machine 13, including conventional forming molds m and involves in its general organization, a stationary framework including supporting legs 10 between which there is supported a lower table 11. The legs 10 are secured by means of bolts 12 to a stationary part of the bottle forming machine 13.

A supporting plate 14 extends across the upper ends of the legs 10 and is secured thereto by means of bolts 15. The prime mover for the bottle forming machine 13 is in the form of a three-phase alternating current motor M having a motor shaft 16 which is connected through a conventional variable speed transmission mechanism 17 to the driven shaft 18 thereof (Fig. 3). The gear ratio between the motor shaft 16 and the driven shaft 18 may be varied by means of a hand wheel 19 which is associated with a controller box 20 mounted on the forming machine platform 21 and which includes a connecting rod 21' extending between the controller box and the transmission mechanism 17. This is standard equipment obtainable in the open market.

The shaft 18 (Figs. 1 and 2) has mounted thereon a pinion 22 which meshes with a relatively large gear 23 mounted on a horizontal shaft 24. The shaft 24 carries a bevel pinion 25 (Figs. 1 and 3) which meshes with a larger bevel gear 26 mounted on a vertical shaft 27, the latter being journalled in bearings, one of which is shown at 28, and which is mounted on the stationary framework of the forming machine. The vertical shaft 27 carries a pinion 29 at its upper end which meshes with the main driving gear 30 of the bottle forming machine.

The large gear 23 meshes with a pinion 31 mounted on one end of a combined brake and jack shaft 32 which is journalled in bearings 33 which are secured by bolts 34 to the table 11.

From the above description of gearing, it will be seen that the brake shaft 32 is geared by a positive train of gearing i. e., through the gears 31, 23, shaft 24, bevel gears 25, 26, shaft 27, and gears 29, 30, directly to the bottle machine 13. In order to assimilate the angular momentum of the relatively heavy forming machine after the supply of current to the motor M has been interrupted and to bring the machine quickly to a standstill, an electrically controlled braking mechanism 35 is associated with the brake shaft 32 or jack shaft and is adapted to be actuated in a manner subsequently to be described whenever the supply of current to the motor M is discontinued.

The braking mechanism 35 (Fig. 1) comprises a brake drum 36 mounted on the brake shaft 32 which cooperates with a pair of brake shoes 37 which are pivotally secured to a pair of brake arms 38. The lower ends of the brake arms 38 are pivoted in a support 47 secured to the table 11. The upper ends of the arms 38 are adjustably connected together by a rod 39 and actuating lever 40 therefor, the outer end of which lever has a pin and slot connection 41 to a link 42 which is in turn connected to the core 43 of a solenoid 44. The solenoid 44 is mounted on a bracket 45 which is supported on the lower table 11.

A coil spring 46 surrounding the rod 39 serves to normally maintain the rod 39 and lever 40 in position to draw the brake arms 38 inwardly and apply a braking torque to the brake shaft 32. Energization of the solenoid 44 in a manner presently to be described, extends the core 43 thereof to cause movement of the rod 39 and lever 40 so as to expand the brake arms 38 and release the braking torque normally applied to the brake shaft 32 by the action of the spring 46.

In order that the angular momentum of the electric motor M shall not be assimilated in the train of gearing connecting the motor shaft 16 to the brake shaft 32 when the supply of current to the motor is interrupted, means is provided for applying a braking torque directly to the motor shaft. Toward this end a second braking mechanism 50, similar in every respect to the braking mechanism 35, as regards its general structure and operation, is associated with the motor shaft 16 and includes an actuating solenoid 51. This braking mechanism in the main is supported on a bracket 52 secured as at 53 to the supporting plate 14.

Referring now to Fig. 3 wherein the electrical connections for the motor M and the two braking mechanisms 35 and 50 are illustrated diagrammatically, the three-phase motor M is provided with the usual lead-in wires a, b and c which are connected through a three-pole switch 54 with a source of current (not shown). The windings of the solenoid 44 are connected by wires d and e to the lead-in wires b and c while the windings of the solenoid 51 are similarly connected by wires f and g to the lead-in wires b and a. Thus it will be seen that when the switch 54 is closed, both solenoids 44 and 51 are energized and the respective braking mechanisms 35 and 50 therefor are maintained in inoperative relation to the brake shaft 32 and motor shaft 16 with which they are respectively associated. When the switch 54 is opened, the supply of current to the solenoids 44 and 51 and the motor M is interrupted. Thus the solenoids 44 and 51 are deenergized and the respective spring actuated braking mechanisms 35 and 50 are actuated in the manner previously described to apply a braking torque to the brake shaft 32 and motor shaft 16 respectively.

If it is desired to operate any auxiliary equipment for the bottle forming machine such as take-out mechanism, leer loading mechanism, bottle uprighting mechanism, etc., a sprocket gear 60 mounted on the brake shaft 32 may serve either as a power take-off or as a timing gear take-off for independently driven synchronizing mechanism as desired. Accordingly, the controlling motor 61 of a synchronous motor combination is shown as being connected by means of chain 63 to the power take-off sprocket gear 60.

Modifications may be resorted to within the spirit of the appended claims:

We claim:

1. Power transmitting apparatus comprising a drive shaft adapted to drive mechanism having a high moment of inertia; means for applying a torque to the drive shaft including an electric motor having a motor shaft, a driven shaft, a gear reduction device connecting the motor shaft and driven shaft whereby the latter is driven at a reduced speed from the motor a relatively small pinion on the driven shaft, and a relatively large gear on the drive shaft meshing with the pinion; a mechanical braking mechanism for applying a braking torque to the motor shaft; spring means normally rendering said braking mechanism operative; a brake shaft; a relatively small pinion on the brake shaft meshing with the relatively large gear on the drive shaft; a second mechanical braking mechanism independent of the first braking mechanism for applying a braking torque to the brake shaft; spring means normally rendering the second braking mechanism operative; a solenoid for each braking mechanism adapted when energized to render the same inoperative against the action of its respective spring means; means electrically connecting the motor and solenoids to a source of current, and a switch common to the motor and both solenoids for interrupting the supply of current thereto.

2. Power transmitting apparatus comprising a drive shaft adapted to drive mechanism having a high moment of inertia; means for applying a torque to the drive shaft including an electric motor having a motor shaft, a driven shaft, a gear reduction device connecting the motor shaft and driven shaft whereby the latter is driven at a reduced speed from the motor, a pinion on the driven shaft, and a gear on the drive shaft meshing with the pinion; a mechanical braking mechanism for applying a braking torque to the motor shaft movable from operative to inoperative positions and vice versa; a solenoid operatively connected to the braking mechanism and adapted when energized to move the same to one of said positions; spring means normally tending to move the braking mechanism to its other position; a brake shaft; a pinion on the brake shaft meshing with the gear on the drive shaft; a second mechanical braking mechanism independent of the first braking mechanism for applying a braking torque to the brake shaft and likewise movable from operative to inoperative positions and vice versa; a solenoid operatively connected to the second braking mechanism and adapted when energized to move the same to one of said latter positions; spring means normally tending to move the latter braking mechanism to the other of said latter positions; means electrically connecting the motor and solenoids to a source of current, and a switch common to the motor and both solenoids for interrupting the supply of current thereto.

HAROLD A. ROHRICH.
CARL A. NIELSEN.